United States Patent [19]

Mathieu

[11] Patent Number: 5,745,310

[45] Date of Patent: Apr. 28, 1998

[54] METHOD AND APPARATUS FOR TEMPORARY VIEW SHIFTING OF VEHICLE SIDE MIRROR

[76] Inventor: Raymond J. Mathieu, 3426 Calumet Rd., Ludlow Falls, Ohio 45339

[21] Appl. No.: 621,786

[22] Filed: Mar. 25, 1996

[51] Int. Cl.[6] .................... G02B 5/08; G02B 7/182
[52] U.S. Cl. ...................... 359/843; 359/841; 359/849; 359/872; 359/877; 359/850
[58] Field of Search .................... 359/850, 855, 359/865, 874, 876, 872, 843, 841, 849, 877

[56] References Cited

U.S. PATENT DOCUMENTS

| | | | |
|---|---|---|---|
| 3,519,336 | 7/1970 | Russell | 369/843 |
| 4,940,322 | 7/1990 | Hamamoto et al. | 359/841 |
| 5,035,496 | 7/1991 | An | 359/843 |
| 5,050,977 | 9/1991 | Platzer, Jr. | 359/872 |
| 5,115,352 | 5/1992 | do Espirito Santo | 359/874 |
| 5,189,561 | 2/1993 | Hong | 359/877 |
| 5,311,368 | 5/1994 | Tsuyama | 359/872 |
| 5,479,297 | 12/1995 | Summers | 359/865 |
| 5,500,766 | 3/1996 | Stonecypher | 359/872 |

FOREIGN PATENT DOCUMENTS

| | | | |
|---|---|---|---|
| 551246 | 7/1993 | European Pat. Off. | 359/877 |
| 3926560 | 2/1991 | Germany | 359/877 |
| 83431 | 3/1989 | Japan | 359/877 |
| 406191349 | 7/1994 | Japan | 359/877 |

*Primary Examiner*—Paul M. Dzierzynski
*Assistant Examiner*—Mohammad Y. Sikder

[57] ABSTRACT

A method and apparatus are provided to allow the operator of a vehicle wishing to change traffic lanes to temporarily scan an angle of the passing lane which is in his or her "blind spot", i.e., an area outside the normal angle of viewing of a conventional flat side rear view mirror. The invention is also useful to divert the headlight reflection from a vehicle in a passing lane out of an operator's eyes. Accomplishment is through temporary pivotal movement of the side mirror to shift the mirror viewing angle from the position at which it had been preset by the operator for normal driving.

9 Claims, 2 Drawing Sheets

METHOD AND APPARATUS FOR TEMPORARY VIEW SHIFTING OF VEHICLE SIDE MIRROR

This invention relates generally to an exterior side rear view mirror of a vehicle for use by a vehicle operator in determining whether it is safe to change into a passing lane, and in particular to a method and apparatus for temporarily shifting the mirror viewing angle laterally outwardly beyond the position to which the operator had set the mirror, in order to determine whether a vehicle may be in the operator's "blind spot". The invention also finds usefulness at night by enabling a driver to shift reflection from the headlights of a passing vehicle out of his or her eyes.

BACKGROUND OF THE INVENTION

A dictionary definition of the term "blind spot" includes not only that area of the human eye which is insensitive to light or an area of weak radio signal reception. The definition also broadly includes any matter about which one is ignorant despite knowledge of related things. In terms of operating a vehicle on a multi-lane highway in heavy traffic conditions, a good defensive driver must be aware not only of what is going on directly in front, but also to the rear and at each side. In addition, when entering a highway at an "on" ramp, a side mirror is of nominal use only because of the relatively large but quickly-narrowing angle of the on ramp with the highway, requiring an operator to physically turn toward the lane he or she wishes to enter, possibly even necessitating leaning forward while doing so. Also, if the driver wishes or needs to position his or her vehicle in a different lane for any reason, the driver must use not only his interior rear view mirror, but also his or her exterior side view mirror or mirrors. Of greatest importance is to be assured that the passing lane into which the driver wishes to change is clear of any vehicle approaching from the rear in that passing lane. A large percentage of the time, such a vehicle can be seen in either the side or a rear view mirror, often both. However, it is not uncommon on multi-lane highways for a passing vehicle to be in the passing lane just slightly behind but just far enough laterally outwardly for that passing vehicle to be in the operator's "blind spot". As used herein, the term "blind spot" means the area outside the preset or normal viewing angle of the side rear view mirror and not within the peripheral vision of the operator while looking straight ahead. When unable to view the blind spot, the operator has knowledge of everything going on around him or her except for whether anything is located in that relatively small blind spot. A frequent occurrence is when a small vehicle is at the outside edge of the passing lane on a multi-lane highway and the operator's vehicle may also be at the outside edge of the slower-moving traffic lane, leaving perhaps eight or ten feet feet laterally between them. The small passing vehicle may thus be out of the viewing angle of the rear view mirror on that side as well as be out of the peripheral vision of the operator. This requires the operator to make a final check of the blind spot by turning his head. In some instances, it is not possible to turn one's head when making a lane change, as in the case of having a stiff neck or neck injury, and the operator must either turn his or her upper torso or else have to rely solely on the side mirror if it appears unsafe to take one's eyes off of the road immediately ahead. A momentary head or torso turn may be sufficient distraction from the traffic ahead so as to cause a rear end collision should the vehicle ahead suddenly slow down or come to a stop. But without such a head or body turn, if an attempt to change lanes is made in sole reliance on a check of the side mirror and a vehicle happens to be present in the operator's blind spot, an accident can possibly occur unless the passing vehicle observes the attempted lane change and either backs off or warns the operator of the vehicle which is attempting the change with his or her horn so as to signal it to stay in its own lane. Where a passenger is present in the vehicle being passed, the operator may request that a check be made of the blind spot by the passenger. Thus, absent a head or torso turn or some other alternative to accomplish the same end, a driver changing lanes is at risk of causing an accident should there be another vehicle in the passing lane driving alongside, but out of the preset angular range of the conventional side rear view mirror.

Some truckers have resolved the blind spot problem by having two mirrors at the driver's side, one large vertical flat-surfaced mirror and an additional convex round mirror placed at a wider, outwardly-directed angle and located below the vertical mirror. Some will place a convex mirror on their fender near the front of the vehicle. Although the convex mirror makes a vehicle in the blind spot appear further away than it really is, truckers who routinely face the problem mentally compensate for this problem through long experience and awareness of what they are viewing. That solution is unacceptable for passenger vehicles, however, because of the frequency with which drivers of the vehicle may be changed, and the likely inexperience of some drivers in dealing with the image-reduction and distortion problems associated with a convex mirror.

Convex mirrors for passenger vehicles are typically used only on the side of the vehicle opposite the driver's side. They usually include a legend such as "OBJECTS IN THE MIRROR ARE CLOSER THAN THEY APPEAR". This is designed to prevent a driver from "cutting in" too soon after passing another vehicle, thinking that the convex mirror truly represents the distance between his and the passed vehicle according to the passed vehicle's size in the mirror. A convex mirror also adds wind resistance and wind noise at higher vehicular speeds, as well as unattractiveness on a stylish auto.

A further problem occurs during night driving, where a passing vehicle's headlights may reflect directly into a driver's eyes from the side mirror. By temporarily shifting the angle of the side view mirror, the focus of the headlights can be redirected to elsewhere than the driver's eyes.

SUMMARY OF THE INVENTION

A method and apparatus are provided to allow the operator of a vehicle wishing to move into a different traffic lane to temporarily, preferably instantaneously, scan a section of the passing lane which is in his or her "blind spot", i.e., an area outside the normal angle of viewing of a conventional flat side rear view mirror. This scan is accomplished via remote control by the operator, and can be done without requiring that the operator turn his head or torso, but by merely shifting his or her eyes as is normally the case when driving along and staying aware of what is going on nearby. This is achieved by providing the reflective surface of the mirror with pivotal movement relative to a base member. The base member is one which is conventionally adjusted to a preset or normal position according to the particular operator's needs, either remotely by manual or electric operating means, or even manually by merely making an adjustment of the mirror itself with the window rolled down. Whenever a momentary scan of the blind spot is required, the operator presses a readily-available switch to pivot the mirror outwardly so as to scan the passing lane blind spot in order to determine whether or not it is occupied by a vehicle. In so doing, the scanned angle is instantaneously and only briefly shifted from the preset side rear viewing position to a second angular position which enables viewing of the blind spot. The operator is then in a position to decide whether or not it is safe to change lanes.

When driving at night, the operator can shift the reflection of a passing vehicle's headlights from the side mirror out of his or her eyes, using the same or an additional different or similarly-operating mechanism.

A principal object of the invention is to enable an operator of a vehicle to temporarily scan whether a passing vehicle is present in a blind spot in the passing lane, prior to changing into the passing lane.

Another object is to enable a driver to shift side mirror reflection of the headlights of a passing vehicle out of his or her eyes.

More specifically, an object of the invention is to obtain the effect of a wide angle mirror through use of a standard-sized flat mirror, and to achieve the effect without optically modifying or distorting the images viewed.

Another object is to rapidly move a side rear view mirror to scan a blind spot in the passing lane for the presence of a vehicle and to quickly return the mirror to the identical position it had occupied prior to being moved.

A further object is to provide a mechanism for moving a side rear view mirror between a preset rear viewing position or angle and a blind spot viewing position or angle by means of closing a momentarily-operated electrical switch and quickly returning the mirror to its normal position upon release of the switch.

An ancillary object is to provide such an operating mechanism which stably maintains the mirror in the both said preset and blind spot viewing positions.

Another object is to mount the entire side mirror and its operating mechanism of this invention within the frontal confines of a conventional wind-resistant mirror pod of a passenger vehicle.

A further object is to enable the improved apparatus to be readily connected to any kind of conventional mirror-positioning mechanism.

Another object is to allow ready viewing of a blind spot alongside and to the rear of an operator's vehicle by an operator who is physically unable to turn his or her head or torso to view the blind spot.

A further object of the invention is to enable an operator to shift the viewing or reflection angle of a side view mirror without taking his or her hands off the steering wheel.

Other objects will become apparent from the following description, in which reference is made to the accompanying drawings.

DESCRIPTION OF THE PREFERRED EMBODIMENT

While the invention disclosed herein was developed for a vehicle which is driven on the right hand side of a road by an operator in the left front seat, it should be understood that it is equally applicable to those vehicles driven on the left by an operator in the right seat. The invention is illustrated herein for right hand side road driving only, for simplicity of understanding. Furthermore, while the invention was developed primarily to solve the problem of scanning the blind spot in a passing lane prior to shifting lanes, it has also been found useful to divert reflection of headlight glare from a side view mirror out of an operator's eyes during night driving. Primary discussion of the structure herein will be directed to the blind spot detection operation, but it should be understood that the invention encompasses night driving advantages as well.

Figure 1:
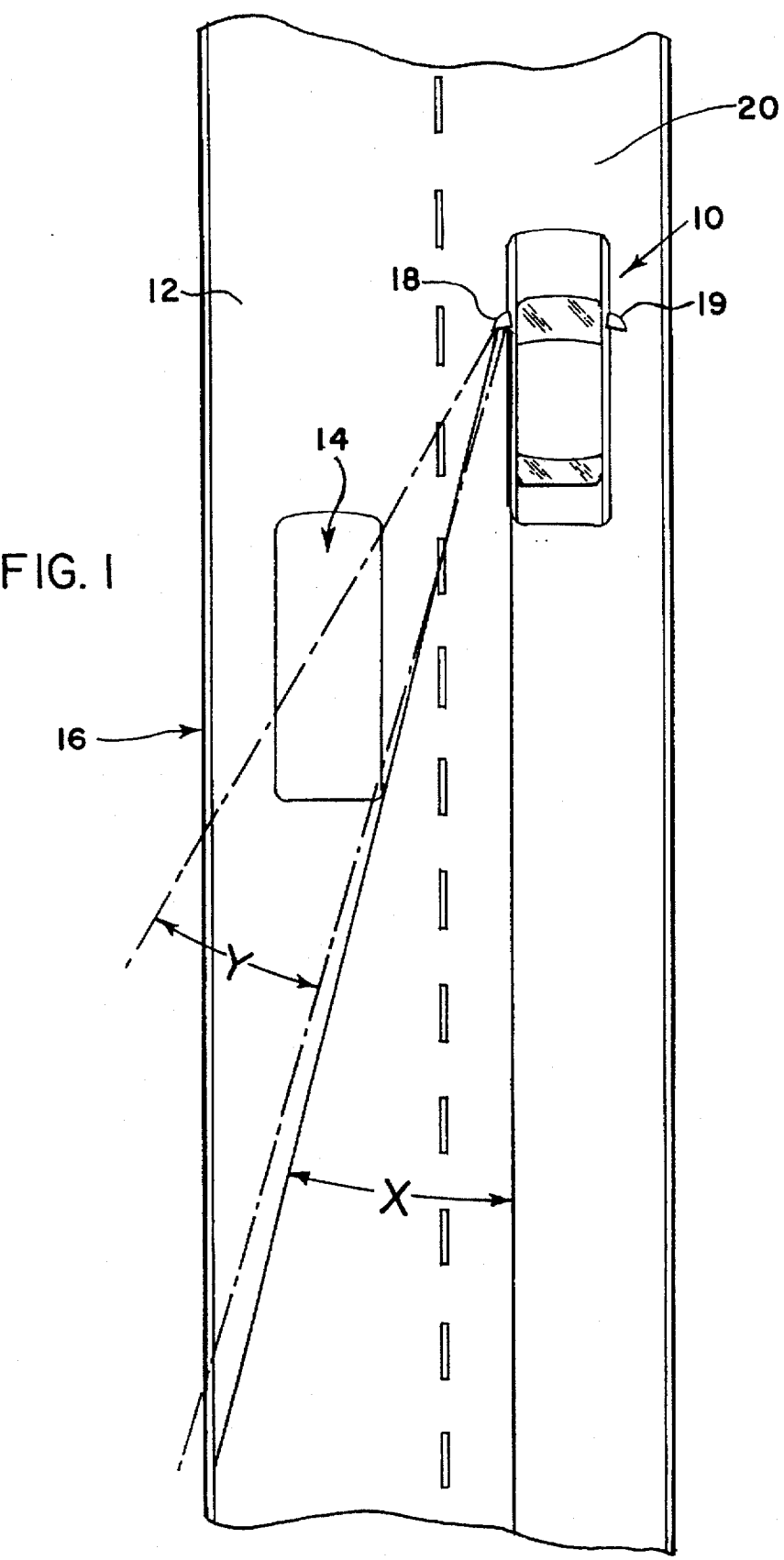
FIG. 1 is a simplified plan view of one vehicle being passed by another in the adjacent left lane. The passing vehicle is located in a "blind spot" which is ordinarily not discernible unless the driver of the vehicle being passed turns his or her head or upper torso.

Referring to FIG. 1, an operator's vehicle 10 is being passed in a passing lane 12 by a second vehicle 14 while vehicle 10 is driving at the right side of the road along a divided highway having multiple lanes in each direction, hereinafter referred to as a multi-lane highway 16. Most vehicles are provided with an internal rear view mirror (not shown) and both left and right side view mirrors 18 and 19 respectively, to enable the operator to be aware of all that is going on behind him. (The word "him" shall hereinafter mean either the male or female gender for purposes of simplifying the description). With the vehicle 10 traveling in the normal or slower speed lane 20, and with the operator having preset the viewing angle of the mirror 18 so as to be able to see outwardly of the left side edge of his vehicle, a normal viewing angle X will provide a view of most of the traffic in the passing lane 12 for some distance back. However, when the passing vehicle 14 reaches the position shown in FIG. 1, particularly if it is at the leftward edge of the lane 12 and the vehicle 10 is at the rightward edge of its lane 20, the vehicle 14 is in the operator's "blind spot". It may reside there, out of sight, for only two or three seconds if passing at eight to ten miles per hour faster than the speed of vehicle 10. In heavy traffic conditions, however, vehicle 14 may linger in the blind spot long enough for the operator to forget of its presence. If the operator wishes to change from his lane 20 to the passing lane 12, he must quickly make a final check of the blind spot before changing lanes. This is usually done by a quick turn of the head or the upper torso, or, if a passenger is present in the car, to ask that person to look back toward the blind spot. Problems can arise if the driver is physically unable to turn or has no passenger to assist in checking the blind spot.

To solve the problem, i.e., to scan the blind spot without the operator having to turn his head, I provide for the temporary shifting of the mirror 18 from the normal viewing angle X to a blind-spot viewing angle Y, shown in dot-dash lines in FIG. 1. Once done, I must quickly restore the mirror to its original position. I have found that an angle of shift of the mirror 18 of as little as eight degrees provides adequate coverage of the typical blind spot, but that angle is illustrative only.

Figure 2:
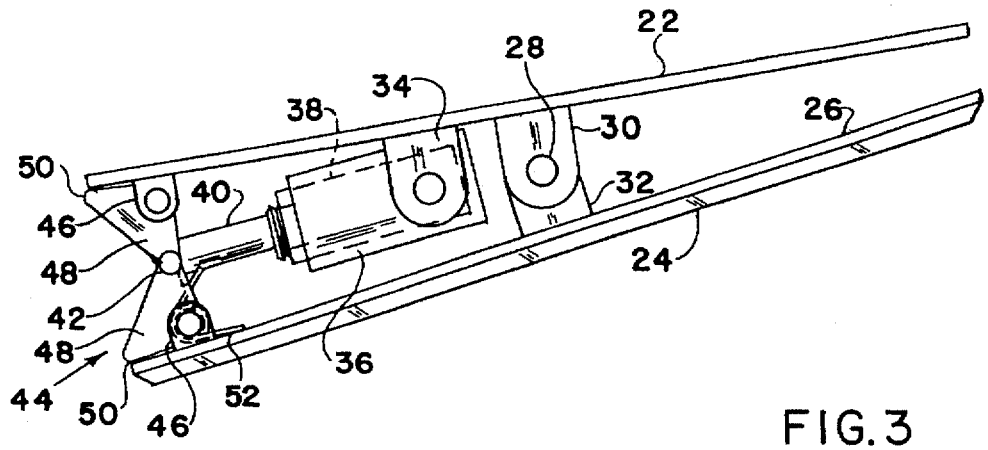
FIG. 2 is a top view illustrating a preferred form of mirror-operating mechanism in a preset or normal rear viewing position.
Figure 3:
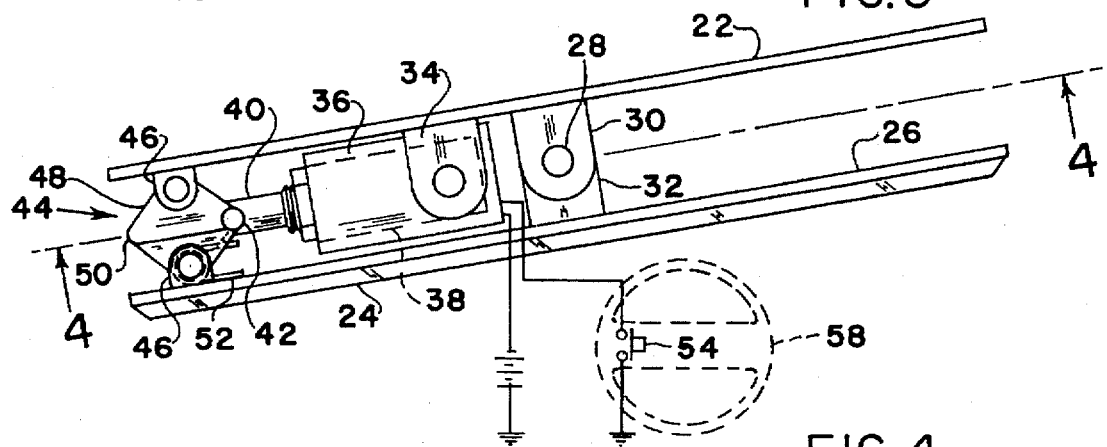
FIG. 3 is a view similar to FIG. 2, but illustrates the mirror having been electrically-actuated by the operator to the blind spot scanning or headlight-deflecting position.
Figure 4:
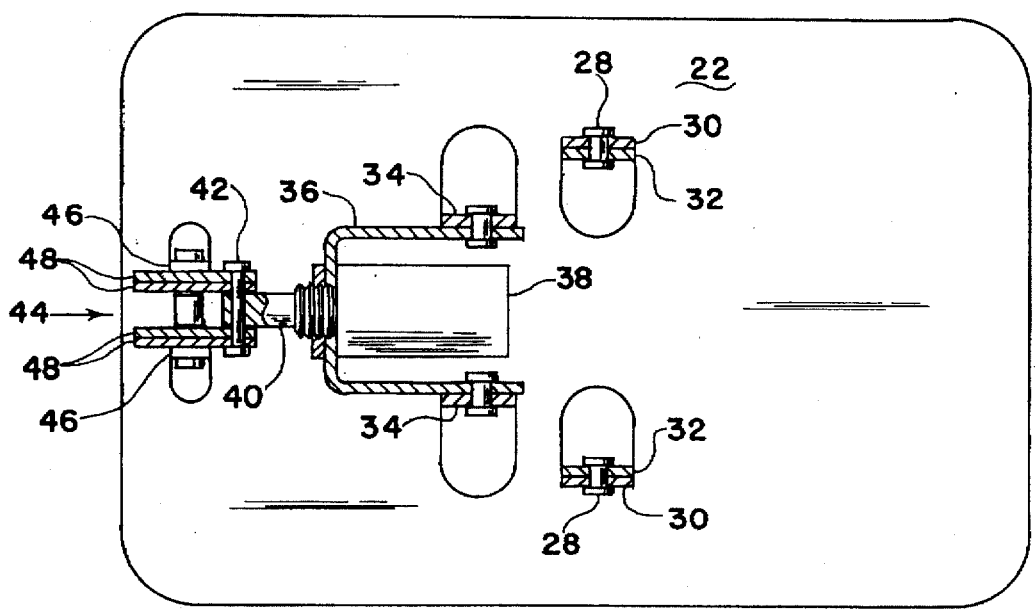
FIG. 4 is an elevational view taken substantially along lines 4—4 of FIG. 3, illustrating certain details of the mirror-operating mechanism.

FIGS. 2–4 show details of a specific structure designed to accomplish the mirror-shifting objectives. A base 22, essentially the same as a conventional mirror support or holder, is typically adjusted manually or by motorized remote control of the operator to a preset position for driving. Since the particular presetting mechanism may be a standard three-cable swivel mechanism, a direct or indirect motor drive or something else understood in the art, it has not been shown. Let it suffice that, for a passenger vehicle, a common way of adjusting the mirror is through mechanical or electrical means operable from within the vehicle to remotely preset the position of the mirror to best suit the particular operator's needs. FIG. 2 shows the mechanism in its inoperative condition, i.e., in the position a mirror 24 occupies when scanning normal viewing angle X of FIG. 1. As will be seen later, the mirror 24 is firmly locked in that position, since a loose or vibrating mirror can be unsafe.

The mirror 24 is fastened to a plate 26 which is pivotally mounted relative to the base 22 at pivot pin 28. The pin 28 may be mounted in pairs of ears 30 and 32 supported on base 22 and plate 26, respectively. A third set of ears 34 on base 22 support a pivotal solenoid mounting bracket 36 which in turn supports an electrical solenoid 38. An armature rod 40 of the solenoid 38 is connected to a center pivot 42 of an over-center or toggle mechanism 44. Small ears 46 support the outer ends of link-stops 48 of the toggle mechanism. FIG. 2 shows the link-stops having tips 50 in engagement with both the base 22 and the plate 26, limiting further movement leftwardly of the over-center mechanism beyond what is shown in FIG. 2. Torsion springs 52 bias the tips 50 into firm engagement with the base and plate, maintaining the plate and base in their inoperative positions shown in FIG. 2 until actuated by the solenoid 38 to scan viewing angle Y.

FIG. 3 shows the operative or activated position of the mirror 24 to scan angle Y for a vehicle in the blind spot. A momentary switch 54, accessible to the operator and preferably mounted on the vehicle steering wheel 58, is depressed to activate the solenoid 38 to move the mirror to the FIG. 3 position. The switch 54 is ideally one in which a button can be depressed to energize the solenoid 38, and upon button release, the switch is biased to cause the solenoid to be immediately deactivated. Rapid action of the mirror is highly desired, so that the mirror can be quickly and firmly actuated to the angle Y viewing position and then restored firmly to its preset, operator-adjusted condition of angle X upon release of the button.

FIG. 4 is a view taken along lines 4—4 of FIG. 3 and further helps to understand the design illustrated. The space between the base 22 and plate 26 can be kept very nominal because of the particular design, enabling the entire mechanism to be kept within the usual pod surrounding the mirror on modern passenger vehicles. By pivoting the mirror essentially centrally between its side edges, total movement can be kept small, enabling the depth of a pod to be kept to a minimum.

Very briefly, to discuss use of the invention for deflecting glare from a driver's eyes at night, the button of switch 54 can be depressed and maintained in depressed condition until the passing vehicle's headlights are alongside and no longer shine directly into the mirror and reflect into the operator's eyes. If the invention is desired for use solely to deflect headlights, the mirror can be pivoted on a horizontal axis, tipping the mirror downwardly in much the same fashion as the inside rear view mirror at the upper center of the windshield is tipped.

If desired, although the cost and design complexity of the unit will suffer, the mirror can be pivoted about a vertical axis to scan a blind spot and also about a horizontal axis to avoid headlight reflection into the driver's eyes.

Various other changes in and uses of the invention may be made without departing from the spirit and scope of the claims.

Having described my invention, I claim:

1. In an apparatus including a mirror mounted on the side exterior of a vehicle for temporarily shifting the viewing angle of the mirror to an angle other than an angle to which the mirror has been preset by the vehicle operator for use during normal driving, said apparatus including:

a base member providing said preset viewing angle of said mirror;

said mirror, when at said preset angle, lying in a generally vertical plane and at an angle substantially perpendicular to said vehicle;

electrically-operable operating means mounting said mirror for limited, essentially instantaneous pivotal movement about a predetermined axis relative to said base member;

a normally-open momentary contact switch accessible to said operator from within said vehicle, said switch being physically activatable and maintainable by said operator in a closed position for energizing said operating means, said switch being dedicated solely to pivot said mirror relative to said base member about said axis to a second angle;

said switch including biasing means quickly restoring said switch to its normally open position to deenergize said operating means and thereby pivoting said mirror from its second angle to said first angle upon discontinuation of physical activation of said switch; and, means for stabilizing said mirror in both its preset and second angles.

2. An apparatus according to claim 1 wherein said operating means includes an electric solenoid intermediate said base member and said mirror and wherein said axis is a substantially vertical axis.

3. An apparatus according to claim 2 wherein the extent or direction of the second angle is shifted to deflect from an operator's eyes the reflected headlights of a vehicle in an adjacent passing lane, said momentary contact switch maintaining said mirror in said second angle throughout activation by said operator.

4. In an apparatus including a mirror mounted on the exterior of a vehicle for viewing by the operator of said vehicle in one traffic lane of other vehicles in an adjacent passing traffic lane while said operator maintains attention ahead in said operator's own traffic lane, said apparatus including:

a base member providing a first normal viewing angle of said mirror;

said mirror, when at said first angle, lying in a generally vertical plane and at an angle substantially perpendicular to said vehicle;

means pivotally mounting said mirror about an essentially vertical axis relative to said base member;

means controllable by said operator for adjusting said base member to said first normal viewing angle position to monitor vehicles alongside and behind said vehicle in said passing lane;

electrically-operable operating means mounting said mirror to said base member;

a normally-open momentary contact switch accessible to said operator from within said vehicle, said switch being physically activatable and maintainable by said operator in a closed position for energizing said operating means, said switch being dedicated solely to pivot said mirror relative to said base member about said vertical axis to a second rear viewing angle to momentarily scan a blind spot location in said passing lane slightly rearwardly of said vehicle, said blind spot location being a location in said passing lane normally not observable through said mirror when said mirror is at said first angle;

means biasing said switch to its normally-open condition to deenergize said operating means and restore said mirror from its second to said first angle upon physical release of said switch; and said operating means including stabilizing means for firmly locking said mirror in both said normal and rear viewing angles.

5. Apparatus according to claim 4 wherein said operating means comprises an electrically-operated solenoid.

6. An apparatus according to claim 4 wherein said operating means and said stabilizing means are positioned intermediate said base member and said mirror.

7. An apparatus according to claim 4 wherein said stabilizing means includes a toggle mechanism which is lockable over-center by spring means whenever said solenoid is in a deenergized state and said mirror is at said first angle.

8. An apparatus according to claim 7 wherein said toggle mechanism includes at least one stop member engagable with either said mirror or said base member to limit outward movement of said toggle mechanism in response to bias by said spring means.

9. An apparatus according to claim 4 wherein said actuating means includes a toggle mechanism having a center pivot located between said base member and the side of the mirror adjacent the base member, said toggle mechanism including link-stop means engagable with at least said base member for firmly locking said toggle mechanism and mirror in said normal viewing angle when positioned therein, and wherein said actuating means further includes an electrical solenoid and a spring for operating said toggle mechanism between said first and said second angles.

\* \* \* \* \*